3,216,919
ELECTROLYTIC GAS GENERATOR
Joseph C. White, University Park, Md., and Sigmund Schuldiner, Washington, D.C., assignors to the United States of America as represented by the Secretary of the Navy
Filed May 4, 1961, Ser. No. 107,867
4 Claims. (Cl. 204—258)
(Granted under Title 35, U.S. Code (1952), sec. 266)

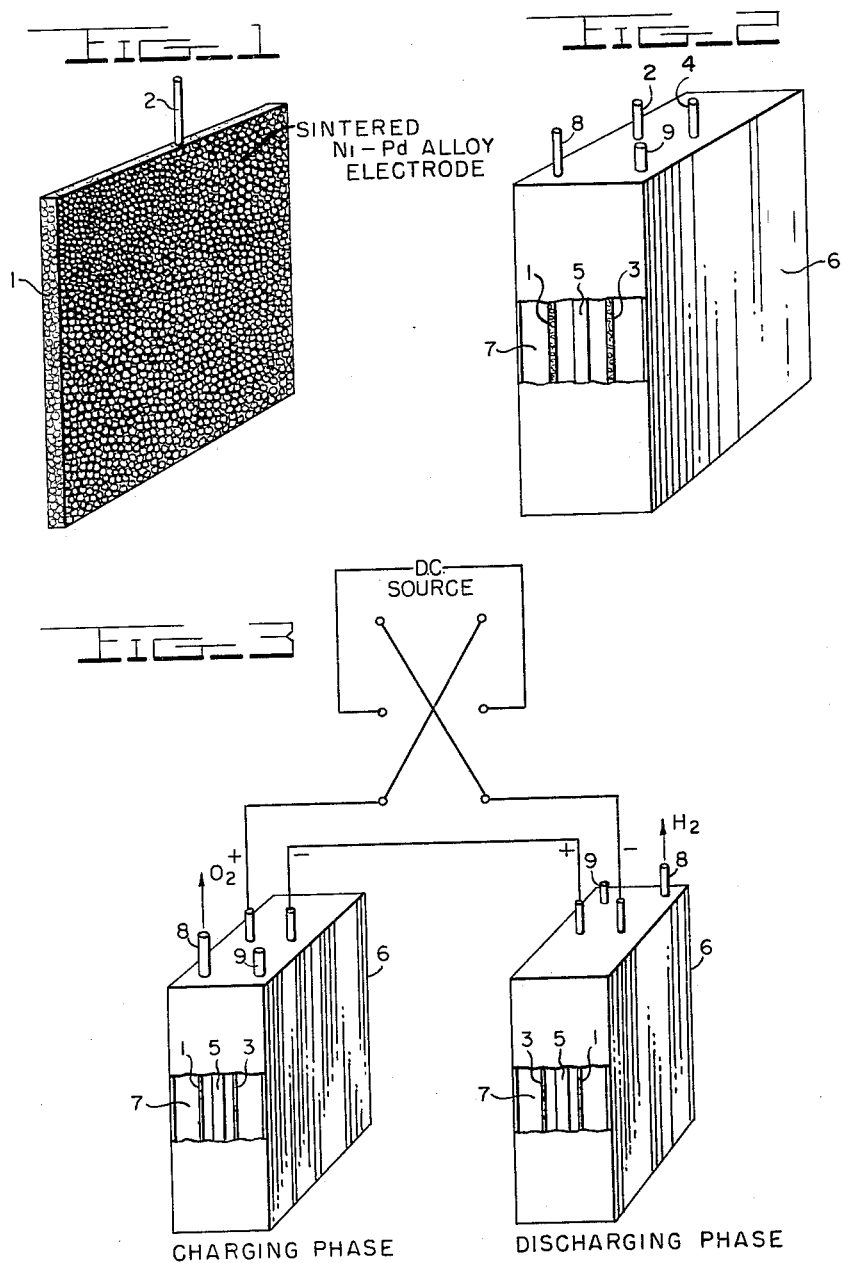

The invention described herein may be manufactured and used by or for the Government of the United States of America for governmental purposes without the payment of any royalties thereon or therefor.

This invention relates to an improved electrolytic gas generator for the production of oxygen by the electrolysis of water.

In the electrolysis of water for the production of hydrogen and oxygen, a direct current is passed through an aqueous alkaline electrolyte, usually a solution of caustic soda or caustic potash. Hydrogen is deposited at the cathode or negative electrode and oxygen at the anode or positive electrode. A porous diaphragm, usually of asbestos, separates the electrodes and allows diffusion of the aqueous electrolyte in the cell. Commercial alkaline electrolytic cells have employed iron or steel electrodes, of which the anodes have been nickel-plated. The cells are provided with sealing means for preventing mixing of the generated gases within the cell and with means for separately collecting the generated hydrogen and oxygen.

The rate of production of hydrogen and oxygen in the electrolytic cell is directly proportional to the density of the current flowing through the aqueous electrolyte in the cell. For a given current density, the power requirement for the cell will depend upon the voltage required to cause this current to flow through the aqueous electrolyte. Any factor which raises the voltage requirement will increase the specific power requirement for the cell and lower its operating efficiency. A known factor of this kind is the occurrence of overvoltage at the electrodes.

An electrolytic gas generator capable of supplying oxygen in a nearly continuous manner by the electrolysis of water is described in U.S. Patent 2,951,802, granted September 6, 1960, to J. C. White and G. W. Work. In the system described in this patent, electrolytic cells are paired to operate simultaneously, either as two cells or banks of cells, with the one cell or bank charging while the other cell or bank is discharging. Oxygen is produced by the cell or bank which is charging and hydrogen by the cell or bank which is discharging. To complete the cycle of operation, the direction of current flow through the paired cells is reversed and by repeated cycling oxygen can be supplied by the system in a nearly continuous manner. The cells in each bank are electrically connected in series to a source of direct current. A current reversing switch is located in the line between the D.C. source and the paired cells. An appropriately valved system of piping is provided for take-off and delivery of the oxygen and hydrogen from the cells. After each half-cycle of operation, before the current flow through the cells is reversed to produce the opposite gas in the individual cells, the head-space of each cell and the gas lines from each cell must be cleared of the gas previously produced by the cell. For this purpose, a vacuum pump, for example, is provided in the piping system for clearing of oxygen from the gas lines and a pump compressor for clearing the hydrogen from the gas lines. The hydrogen, being the unwanted gas of the electrolysis, is discharged in some safe manner. In the use of the oxygen generating system in a submarine, the hydrogen is pumped overboard and the oxygen delivered into the atmosphere of the submarine.

The present invention has a general object improvement in the operation economy of electrolytic oxygen generator systems of the kind described above. It is a particular object to provide a modified electrolytic oxygen generator system of the kind described above which can be operated with a lower specific power requirement.

We have found that the above and other objects can be accomplished in accordance with our invention by employing as the electrolytic cells in oxygen generating systems of the type described above, alkaline type electrolytic cells in which the electrodes are paired plates of which the one plate is cadmium-active and the other is formed essentially of nickel-palladium alloy in which the palladium is present in a small amount, of the order of from about 0.1 to 2% by weight (.05 to 1 atomic percent. The nickel and palladium of the alloy may be of electrolytic grade or of higher purity.

For a more complete understanding of the invention reference is had to the accompanying drawing in which like numerals indicate like parts and in which:

FIG. 1 is a view in illustration of a nickel-palladium alloy electrode used in electrolytic cells in the improved oxygen generator in accordance with the invention, FIG. 2 is a view, partly broken-away, in illustration of an electrolytic cell used in paired relationship in the improved oxygen generator in accordance with the invention, and FIG. 3 is a view, partly schematic, of an oxygen generator system equipped with paired electrolytic cells in accordance with the invention.

Referring to the drawing, FIG. 1 shows a nickel-palladium alloy plate electrode at 1 which in accordance with the invention is used in paired relationship with a cadmium-active plate electrode in the electrolytic cells of the improved oxygen generating system. A terminal 2 is provided on the electrode for electrical connection when assembled in the cell. The terminal 2 may be of copper, nickel or other suitable metal and affixed to the electrode in any suitable way, as by welding thereto.

The metal-palladium alloy electrode 1 may be a rolled sheet or cast plate of the alloy, or a sheet or plate of a base metal such as iron or steel which is clad with the nickel-palladium alloy. Preferably, the electrode 1 is of porous sintered metal construction as shown in FIG. 1. A preferred nickel-palladium alloy for the electrode is one containing about 2% by weight palladium. The porous sintered metal type electrode can be made by the use of known techniques for the construction of sintered metal articles in which the metal in powder form is applied to a sheet of wire mesh and sintered thereon. A layer of the nickel-palladium alloy in powder form is applied to one side of a sheet of wire mesh of nickel or of nickel-plated steel or of other aqueous caustic alkali-resistant metal and sintered thereon. A similar layer of the nickel-palladium alloy powder is then applied to the other side of the sheet of wire mesh and sintered thereon.

FIG. 2 shows an electrolytic cell of the alkaline type provided with a nickel-palladium alloy electrode plate 1 and a cadmium-active electrode plate 3 in accordance with the invention. A terminal 4, similar to the terminal 2 on electrode 1, is provided on the electrode 3. The thickness of the electrodes 1 and 3 may be varied and correspond to that of electrodes heretofore employed in alkaline type electrolytic cells. The cadmium-active electrode 3 may be of the known pocket-type construction in which a skeleton of metal resistant to aqueous caustic alkali solution is filled with cadmium, such as a nickel-plated multi-perforated steel plate having the pockets filled with cadmium or a porous sintered nickel plate in which the pores are filled with cadmium.

The plate electrodes 1 and 3 may be separated in the cell by means of a porous diaphragm 5 of asbestos fibers or of other material which is resistant to attack by caustic alkali solution. Where the electrodes are strong enough to resist buckling, the use of a separator for the electrodes may be dispensed with. The casing 6 of the cell may be made of stainless steel or nickel-plated steel or of other suitable caustic alkali-resistant material. An aqueous alkaline electrolyte is shown at 7 which may be a solution in water of caustic soda or caustic potash in a concentration of from about 15 to 35% by weight of the caustic alkali. An outlet pipe 8 which communicates with the interior of the cell is provided for separate collection of the gas generated in the cells when they are operated in paired relationship in the improved oxygen generating system of the invention. A pipe 9 communicates with the interior of the cell for introducing the aqueous alkaline electrolyte and for addition of water to the cell as needed. The cell, otherwise, may be of conventional construction and arrangement of parts for oxygen-hydrogen generating cells of the alkaline type, including means for sealing of the cell against seepage of gas therefrom and mixing of generated gases in the cell.

FIG. 3 illustrates in a schematic manner oxygen generating system similar to that described and shown in the aforementioned White and Work patent which, following the invention, is provided with a pair of the electrolytic cells containing an electrode pair as described above and illustrated in FIG. 2. The electrodes 1 and 3 of the two cells are electrically connected in series to a suitable direct current source through a current reversing switch which may be a double pole-double throw switch as shown. The improved gas generating system of the invention is provided as described in the aforementioned White and Work patent with suitable valved piping and pumps (not shown) for clearing of the system and collecting the generated gas from the outlet 8 of each cell and for safe disposal of hydrogen and with suitable valved piping (not shown) for adding of the aqueous alkaline electrolyte and water to the cells.

In operation of the improved oxygen generating system of FIG. 3, the cells provided with the aqueous alkaline electrolyte 7, which may be, for example, a water solution of 20 to 30% by weight caustic potash, are connected in series to the direct current source through the current reversing switch. The cells are operated alternately on charge and discharge by reversing the polarity of the current flowing through the cells to produce oxygen and hydrogen, respectively. To put the one cell on charge, the lead to the nickel-palladium alloy electrode 1 from the reversing switch is made positive. The electrode 1 becomes the anode and the cadmium-active electrode 3 the cathode of the cell on charge. At the same time, the other cell is put on discharge by having the lead to the nickel-palladium alloy electrode 1 from the reversing switch, negative. The electrode 1 becomes the cathode and the cadmium-active electrode 3 the anode of the cell on discharge.

During the charging phase in the one cell, cadmium of the electrode 3 (cathode) undergoes reduction from cadmium hydroxide to elemental cadmium and oxygen is evolved at the nickel-palladium alloy electrode 1 (anode). The reactions at each electrode may be expressed as follows:

Charging cell:

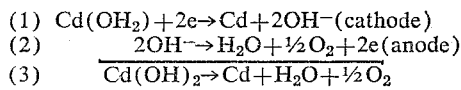

(1) $Cd(OH_2) + 2e \rightarrow Cd + 2OH^-$ (cathode)
(2) $2OH^- \rightarrow H_2O + \frac{1}{2}O_2 + 2e$ (anode)
(3) $\overline{Cd(OH)_2 \rightarrow Cd + H_2O + \frac{1}{2}O_2}$ In the meantime the other cell is in the discharging phase with the nickel-palladium alloy electrode 1 functioning as the cathode and the cadmium-active electrode 3 as the anode. In the discharging phase cadmium of the electrode 3 undergoes oxidation to cadmium hydroxide and hydrogen is evolved at the electrode 1. The reactions at each electrode may be expressed as follows:

Discharging cell:

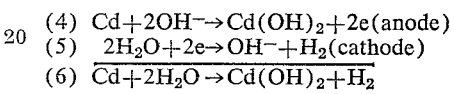

(4) $Cd + 2OH^- \rightarrow Cd(OH)_2 + 2e$ (anode)
(5) $2H_2O + 2e \rightarrow OH^- + H_2$ (cathode)
(6) $\overline{Cd + 2H_2O \rightarrow Cd(OH)_2 + H_2}$ The discharge operation is continued until all the cadmium has been oxidized to $Cd(OH)_2$. The cell operations are then reversed by reversing the polarity of the current flowing through the cell pair. In use of the system on submarines, the oxygen from the system would be delivered to the working area and the hydrogen discharged overboard.

In the course of operation of the system and in respect to the electrolytic cell in the discharge phase with the nickel-palladium alloy electrode as the cathode, the palladium in the alloy is in part converted to palladium black which deposits as a film on the surface of the cathode at the interface with the aqueous alkaline electrolyte. The palladium black formed on the surface of the nickel-palladium alloy cathode is a catalyst for the electrolytic hydrogen-producing reaction and better in this respect than is nickel. This catalysis directly affects the polarization of the cathode with the result that there is a lowering of the hydrogen overvoltage at the cathode and in the cell and consequent reduction in the specific power consumption for the cell at a given current density. The result is comparable to that which can be obtained with the use of a pure palladium cathode. Cathodes of sintered nickel-palladium alloy containing from about 0.1 to 2% by weight palladium are effective to produce a marked lowering of the hydrogen overvoltage in the operation of electrolytic cells of the type described. The reduction to be obtained in overvoltage at the cathode is greater for the higher current densities which are employed in commercial operation of electrolytic hydrogen-oxygen cells. For such commercial operations and at an operating potential for the cell of 2.2 volts, the hydrogen overvoltage can be lowered by as much as 0.3 volt with the use of a porous electrode of sintered nickel-palladium alloy containing 2% by weight palladium as the cathode for the cell. Such a reduction in the voltage for the cell represents a material reduction in the power consumption for the cell at a given current density and by consequence an increase in the operating efficiency of the cell and of the system.

While the principle of our invention has been described above in relation to an oxygen generating system in which the cells contain a simple electrode pair, it is obviously not limited thereto but can be applied with similar advantage using multi-plate hydrogen-oxygen electrolytic cells. Cells of this type which are of conventional construction may be modified to contain a plurality of plate electrodes of the nickel-palladium alloy containing from about 0.1 to 2% by weight palladium in alternation with one more in number of cadmium-active plate electrodes. The several electrodes may be separated or not in the cells as described above.

Further, the principle of our invention can be practiced with similar advantage using banks of the cells as described herein appropriately connected electrically to operate as units, the one unit being on charge and the other on discharge in alternate fashion.

Since the principle of the invention described herein may be variously embodied without departing from the spirit or scope of the invention, it is intended that the description herein shall be taken by way of illustration rather than in limitation except as may be required by the appended claims.

What is claimed is:

1. A system for the production of oxygen by the electrolysis of water which comprises in combination paired electrolytic cells designed for operation with an aqueous alkaline electrolyte and electrically connected in series for reversal of current flow therethrough and alternate production of oxygen therein, said electrolytic cells having paired plate electrodes of which the one electrode is cadmium-active and the other is formed essentially of nickel-palladium alloy containing from about 0.1 to 2% by weight palladium.

2. A system for the production of oxygen by the electrolysis of water which comprises in combination paired electrolytic cells designed for operation with an aqueous alkaline electrolyte and electrically connected in series for reversal of current flow therethrough and alternate production of oxygen therein, said electrolytic cells having paired plate electrodes of which the one electrode is cadmium-active and the other is formed essentially of nickel-palladium alloy containing about 2% by weight palladium.

3. A system for the production of oxygen by the electrolysis of water which comprises in combination paired electrolytic cells designed for operation with an aqueous alkaline electrolyte and electrically connected in series for reversal of current flow therethrough and alternate production of oxygen therein, said electrolytic cells having paired plate electrodes of which the one electrode is cadmium-active and the other is formed essentially of porous sintered nickel-palladium alloy containing from about 0.1 to 2% by weight palladium.

4. A system for the production of oxygen by the electrolysis of water which comprises in combination paired electrolytic cells designed for operation with an aqueous alkaline electrolyte and electrically connected in series for reversal of current flow therethrough and alternate production of oxygen therein, said electrolytic cells having paired plate electrodes of which the one electrode is cadmium-active and the other is formed essentially of porous sintered nickel-palladium alloy containing about 2% by weight palladium.

References Cited by the Examiner

UNITED STATES PATENTS

| | | | |
|---|---|---|---|
| 1,427,171 | 8/22 | Smith | 204—292 |
| 2,070,612 | 2/37 | Niederreither | 204—129 X |
| 2,951,802 | 9/60 | White et al. | 204—129 X |

JOHN H. MACK, *Primary Examiner.*